United States Patent
Tuller

[15] 3,705,347
[45] Dec. 5, 1972

[54] WIRING ASSIST DEVICE FOR USE IN THE FABRICATION OF WIRE HARNESSES

[72] Inventor: Elry D. Tuller, Detroit, Mich.

[73] Assignee: Burroughs Corporation, Detroit, Mich.

[22] Filed: Aug. 21, 1970

[21] Appl. No.: 65,909

[52] U.S. Cl. ............324/66, 29/203 MW, 29/593, 324/51
[51] Int. Cl. ................................G01r 31/02
[58] Field of Search ......324/51, 66, 73; 29/203 MW, 29/203 B, 593

[56] References Cited

UNITED STATES PATENTS

| | | |
|---|---|---|
| 3,600,673 | 8/1971 | Kohke ..................324/66 X |
| 3,440,531 | 4/1969 | Jasorka et al............324/66 |
| 3,407,480 | 10/1968 | Hill et al.................324/66 X |
| 3,052,842 | 9/1962 | Frohman et al. ........324/66 |
| 3,250,992 | 5/1966 | Cronkite et al..........324/66 |
| 3,521,161 | 7/1970 | Kurata et al............324/66 |

*Primary Examiner*—Gerard R. Strecker
*Attorney*—Kenneth L. Miller and Edwin W. Uren

[57] ABSTRACT

A system for providing a successive step-wise indication of electrical terminals to be interconnected within one or more arrays thereof, where an indication of the next connection to be made is automatically given whenever all preceding connections have been properly made. Any preceding connections becoming faulty during a connecting sequence are indicated by the system one at a time in the required order until all connections are repaired, at which time the next connection to be made in the sequence is indicated.

11 Claims, 4 Drawing Figures

PATENTED DEC 5 1972 3,705,347

INVENTOR.
ELRY D. TULLER
BY Edwin W Uren
AGENT

WIRING ASSIST DEVICE FOR USE IN THE FABRICATION OF WIRE HARNESSES

BACKGROUND OF THE INVENTION

The invention relates to apparatus for assisting in the wiring of electrical components and more specifically to connection sequence control and testing devices for such apparatus.

In the commercial production of most electronic systems the electrical interconnection of various circuits comprising the system is a relatively time-consuming step in the manufacturing process. A rudimentary and early method in the art for carrying out such a step in the manufacturing process consists of supplying a wireman with a printed list of steps which, for example, might read, "Connect terminal A to terminal B with a red wire, connect terminal B to terminal D with a blue wire," etc.

Subsequent improved methods sought to decrease the number of interpretive steps required of a wireman by the printed list method and to provide means for decreasing the probability of improper connections. A common improved type of wiring method generally provided for the association of one or more visual indicators such as lights with each terminal, and sequentially turned on the associated lights in the predetermined sequence in which the terminals were to be connected. Some of the improved methods included a light or other indicator associated with each of the various wires that were to be used in making the connections, the wire indicators being activated concurrently with the terminal-associated indicators to show a wireman which wire was to be used for a particular connection. Generally after completing one connection, a wireman was required to close a switch to thereby activate the indicators corresponding to the next connection in the sequence.

A testing or verifying feature of some of the prior art methods or systems served to prevent a change in indicator activation until the preceding connection is properly made. In this manner each connection is tested after it is made and before the next connection is undertaken. Such systems, however, provided no test for connections that subsequently become faulty due, for example, to the inadvertent disengagement of previously made connections.

SUMMARY OF THE INVENTION

It is generally an object of the present invention to provide a system for assisting a wireman in electrically connecting a complex array of electrical terminals with the lowest possible probability of error.

It is another object of the invention to assist a wireman in making the connections in the shortest possible time.

It is further an object of the invention to provide automatic sequencing from connection to connection, such sequencing being predicated upon the accuracy and reliability of previously made connections.

It is still further an object of the invention to provide, as an integral part of the system, means for continually testing the integrity of the previously made connections.

The invention accomplishes these objects by combining an array of indicators corresponding in arrangement to an array of electrically connectable terminals and an indicator control system that programmatically actuates succeeding indicator groups that show the connections next to be made. The indicator control system additionally provides a continuous check of all previously wired connections, and activates those indicators that correspond to connector terminals that have developed a faulty connection, such activations taking place in a continuing sequence until all faulty connections have been repaired, at which time the next connector terminals to be wired are indicated.

BRIEF DESCRIPTION OF THE DRAWINGS

To more adequately point out the invention a description of a specific example propounding a preferred manner in which the inventive concept may be embodied is set forth below, with reference to the drawings in which.

DESCRIPTION OF THE PREFERRED EMBODIMENT

Figure 1:
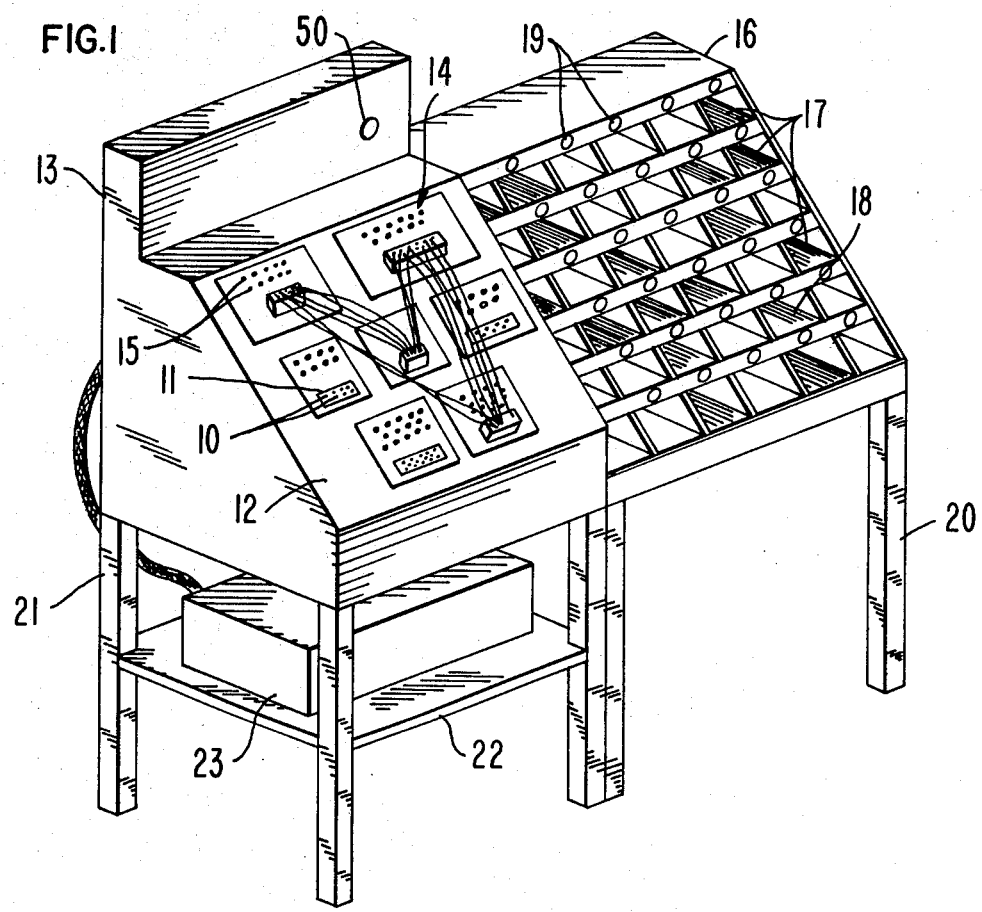
FIG. 1 is an isometric view of a preferred harness wiring apparatus in which the inventive control system is embodied.

One application for a preferred embodiment of the invention is aimed at assisting a wireman in fabricating a wire harness such as is used to electrically interconnect a plurality of terminals on the back plane of a computer system. Apparatus for employing the invention in such manner is shown in FIG. 1 where, as illustrated, the electrical terminals 10 to be individually interconnected are grouped in rectangular shaped arrays 11. Each array 11 of terminals is positioned on a front panel 12 of an array support box 13. Disposed directly above each rectangular array 11 of terminals on the front panel 12 is an arrangement of indicator lights 14 in which the positions of individual lights 15 within the arrangement correspond to the positions of individual terminals 10 within an associated array 11 of terminals so that an operator seeing one of the indicator lights turned on can easily identify a corresponding electrical terminal.

Adjacent to the array support box 13, a wire container 16 is conveniently positioned for access by a wireman who has positioned himself in front of the apparatus. Bins 17 of varying depths in the wire container 16 hold wires 18 of varying grades and lengths for use in connecting the terminals 10 of the several rectangular arrays 11. A wire indicator light 19 positioned above each bin 17 serves to signal a wireman which wire is needed for a particular terminal interconnection. Stands 20 and 21 support the wire container 16 and the array support box 13, respectively, at a convenient height.

On a lower shelf 22 of the stand 21 supporting the array support box 13 is an indicator control system 23 that sequentially activates appropriate indicator lights 15 and 19 of the front panel 12 and wire container 16, sequentially revealing to the wireman which wires 18 are to be used to connect which terminals 10.

Figure 2:
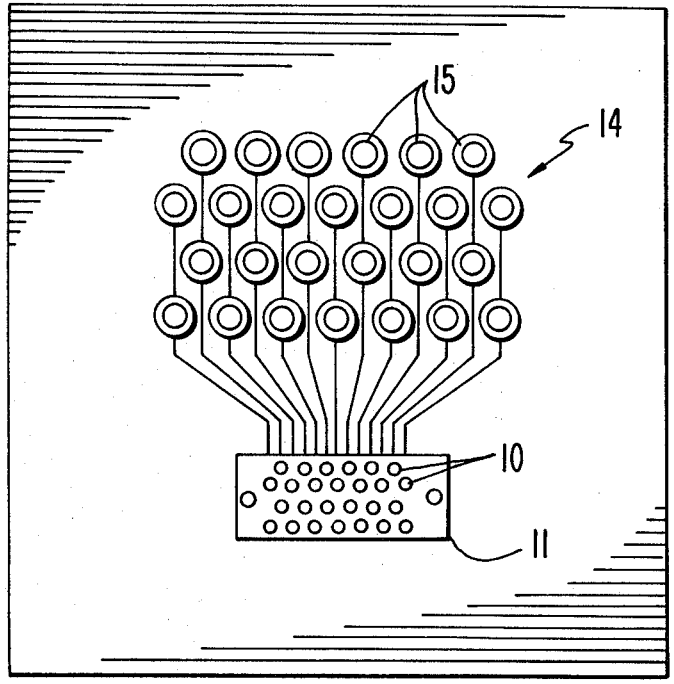
FIG. 2 is a front detailed view of an array of electrical terminals and a corresponding arrangement of indicator lights.
Figure 3:
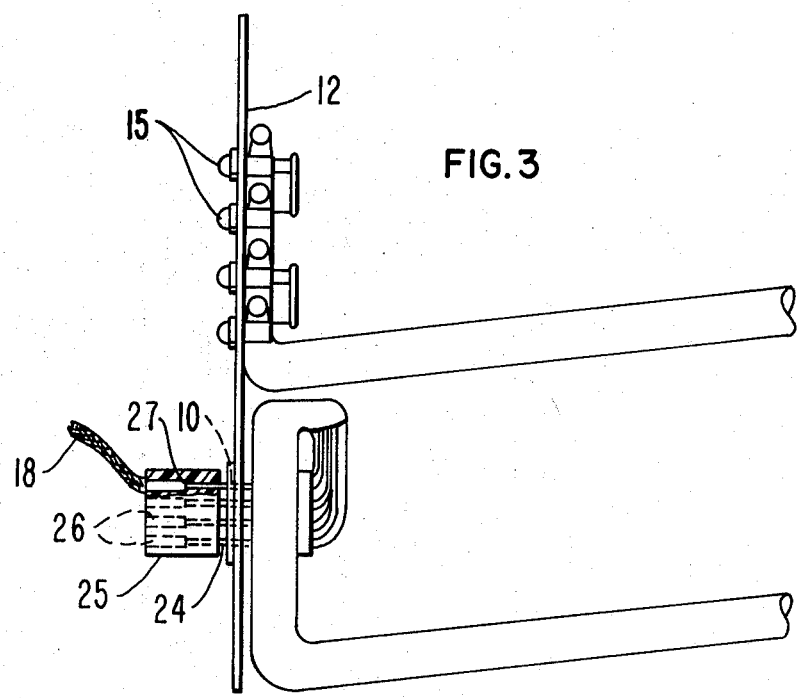
FIG. 3 is a side view of the array of terminals shown in FIG. 2 additionally showing a terminal plug engaged with the array of terminals with a cut-away portion of the plug showing a connecting wire inserted into electrical contact with a terminal plug connector pin.

The electrical terminals 10 on the front panel 12, as shown in FIGS. 2 and 3, are each characterized by an electrically conductive material formed as an open-ended cylinder into which connector pins 24 of a terminal plug 25 are inserted before the fabrication of a harness begins. Each terminal plug 25 inserted into an array of terminals 11, after being properly wired, becomes a plug on the end of a leg of a completed harness. After the connector pins 24 of a terminal plug 25 have been inserted into corresponding terminals 10, the face of the plug exposed to a wireman has a correspondingly ordered arrangement of holes 26 each intercepting the end of a connector pin 24 embedded in the terminal plug. For making a connection the wireman inserts an end 27 of a wire 18 into a designated hole 26 in the terminal plug 25, until such wire clips onto and forms an electrical contact with the embedded end of the connector pin 24. Retaining means on the end of the wire mates with an appropriate connection on the embedded end of the connector pin, establishing a secure connection therebetween.

The indicator control system 23, among other functions, determines which group of visual indicators or lights are to be actuated for each step in the harness fabrication process. It will be recalled that each actuated group of lights 15 are symbolic of a group of terminals 10 within the rectangular arrays 11 that are to be interconnected by a wireman. In the harness fabrication process that is illustratively being implemented by the preferred system, instructions in the form of actuated indicators are sequentially provided for each wire that is to be assembled in the harness, each instruction being characterized by the illumination of three lights, two of the lights representing two terminals 10 that are to be interconnected and the third indicating the wire 18. It is, however, possible to use the subject control system 23 irrespective of the number of terminals that are to be interconnected. In other words, a larger number of indicators (more than three) could be actuated by the control system 23, depending upon how many terminals are required to be interconnected for any given step in the fabrication process.

In addition to defining a group of indicators to be activated, the indicator control system 23 provides switching means for such indicator group activation and for controlling the sequence of the activations.

The control system 23, as herein described, is programmable in a broad context, i.e., the redefinition of indicator groups or the re-requiring of indicator group actuations would require the mechanical rewiring of the system. Rewiring procedures may, however, be carried out by other programmatic connecting means, such as well known types of electronic switching networks, without altering the true nature of the subject invention. The inventive system hereinafter disclosed comprehends all obvious methods of connecting groups of indicators 15 to define indicator groups and all obvious manners of connecting terminals for defining a terminal connecting sequence.

Figure 4:
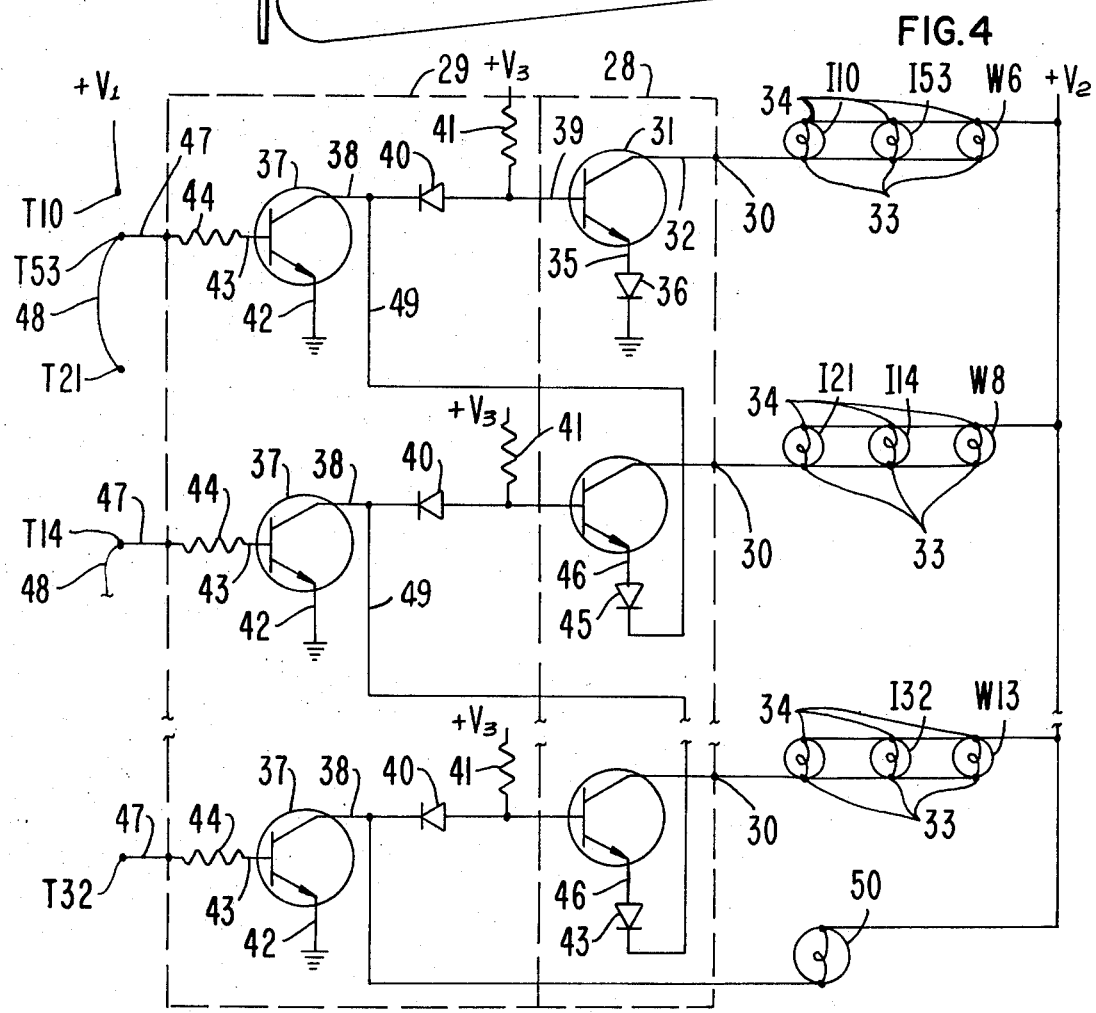
FIG. 4 is a schematic showing a preferred indicator activating system.

The subject control system 23, as illustrated in FIG. 4, generally includes an indicator actuating means 28 for turning on the indicators or lights 15 corresponding both to the terminals 10 that are to be interconnected and the connecting wire for each step in the harness fabrication process. A means 29 effective for controlling the indicator actuating means is additionally included in the control system 23. Indicator groups are defined by the manner in which individual indicators 15 are electrically connected to outputs 30 from the actuating means 28. All of the indicators or lights 15 connected to one of the outputs 30 define a group, as at I10, I53 and W6.

The sequence in which the different indicator groups are actuated is established by the manner in which the control means 29 is connected to the various terminals 10 on front panel 12 of the support box. Specifically, one terminal corresponding with each defined indicator group, as T53, is connected to the control means 29. The connected terminal T53 is further connected to one of the terminals in a succeeding terminal group, as at T21. As can be noted from FIG. 4, when a wireman interconnects the terminals in a group, as T10 and T53, a circuit is completed to a positive voltage source $+V_1$ which indicates to the control means 29 that the succeeding group of indicators I21, I14 and W8 are to be activated.

The indicator activating means 28 has an indicator switching member or a first NPN transistor 31 associated with each defined indicator group. The collector 32 of each first transistor 31 is tied to common terminals 33 of a group of indicators or electric lights, as at 30. Other common terminals 34 of each group of lights 15 are tied to a positive voltage source $+V_2$. The emitter 35 of the first transistor 31 associated with the first group of terminals T10 and T53 to be interconnected is grounded via a diode 36, while the emitter of each succeeding first transistor is connected to the indicator actuating control means 29 associated with the preceding group of terminals.

For controlling the conducting states of each first transistor 31, the indicator actuating control means 29 provides an indicator switching control member or second NPN transistor 37 having its collector 38 tied to the base 39 of an associated first transistor 31 via a current driving diode 40. A positive voltage source $+V_3$ is connected with an intervening resistor 41 at a common node with the base 39 of each first transistor 31. The emitter 42 of each second transistor 37 is grounded and its base 43 is tied to the terminal 10 within its associated group of terminals that is connected to another terminal 10 within a succeeding group, as at T53 or T14. A resistor 44 intervenes between the base 43 of each second transistor 37 and its connected terminal 10. The collector 38 of each second transistor 37 is electrically coupled via a diode 45 to the emitter 46 of the first transistor 31 associated with the succeeding indicator group in the harness fabrication sequence.

OPERATION

During a harness fabrication process, the indicator control system 23 both sequentially actuates individual groups of terminal indicators, and constantly tests all of the connections previously made in the fabrication process. Both functions are inherent in the system's design.

As has been previously stated, each defined group of actuatable indicator lights 15 represents one of a group of terminals 10 that a particular wiring process requires to be interconnected, and the wire that is required for the connection. These groups of lights 15, such as I10, I53 and W6, are programmatically defined by their connection to a common indicator switching member or first transistor 31 of the indicator actuating means 28. The sequence in which the individual groups of lights 15 are actuated, or turned on, determines the order in which corresponding terminal groups are each interconnected in the particular wiring process being implemented. Another step removed in the chain of causation, the sequence of light group actuation is (in a broad sense) programmatically determined for the control system by three electrical connections per terminal group; one connection being from one terminal 10 in each group to the base of an associated indicator switching control member or second transistor 37, as at 47, and from each transistor connected terminal to a terminal 10 in the succeeding terminal group, as at 48; the second connection being from the collector 38 of each second transistor 37 to the emitter 46 of the first transistor 31 associated with a succeeding terminal group, as at 49; and the third being from the collector 32 of each first transistor 31 to all of the indicators in a defined group as at 30.

Once the indicator groups and the indicator group activation sequence have been programmatically defined, as explained above, the indicator control system 23 is prepared to begin assisting a wireman in carrying out the programmed wiring sequence, which in the preferred example is a harness fabrication process. Referring to FIG. 4, the first connection to be made by the wireman is between the terminals T10 and T53, corresponding to the actuation indicator lights I10 and I53. A third indicator light W6, located adjacent to a wire bin 17, is also lit indicating the wire to be used for the connection. After the first connection T10 to T53 is completed, the base 43 of the indicator actuation control or second transistor 37 tied to T53 assumes the potential of the voltage source $+V_1$ thus biasing the second transistor 37 in a conducting state and dropping the base voltage of its coupled first transistor 31 to ground. So biased the first transistor 31 assumes a non-conducting state, thus raising the voltage of its light-connected collector 32 to turn off the connected indicator lights I10, I53 and W6. Concurrently, the low voltage at the collector 38 of the second transistor 37 and the base 39 of the first transistor 31 is reflected as the emitter 46 of the first transistor 31 associated with the succeeding indicator group I21, I14 and W8 of the fabrication process. The succeeding first transistor 31 is thus biased in a conducting state and the consequent low voltage of its collector 32 turns on the indicators I21, I14 and W8 corresponding to the next group of terminals T21 and T14 to be connected. In a similar manner when terminals T21 and T14 are connected, its corresponding lights I21, I14 and W8 are turned off and the succeeding indicator light group is turned on.

A finish indicating light 50 on the front panel 12 coupled with the collector 38 of the second transistor 37 that is associated with the last connection of the fabrication process is switched on when the final connection of the process is completed.

An activation of the finish light 50 not only signifies that the last connection of the process has been made, but that all connections of the finished harness are properly completed. If, for example, the fabrication of a harness was nearing completion and a connection that had been previously made, such as between T21 and T14, is somehow disengaged, the voltage at the base 43 of the second transistor 37 that is coupled to a terminal T14 of the disconnected terminal group will suddenly drop. The second transistor 37 will be biased in a non-conducting state, thereby turning on the group of indicator lights I21, I14 and W8 corresponding with the disconnected group of terminals T21 and T14 by the mechanism described above.

It can be discerned from the foregoing description that if more than one terminal group were disconnected the subject control system 23 would sequentially activate those indicator lights 15 corresponding to each disconnected terminal group. After the first faulty connection of the sequence were repaired, the next faulty connection in the sequence would be indicated until all terminal groups had been reconnected.

What is claimed is:

1. Apparatus for assisting a wireman in the fabrication of a wire harness, said harness including a plurality of terminal plugs each representing a separate leg thereof, each of said plugs having a plurality of projecting pins arranged on one side thereof and a corresponding number of communicating cylindrical receptacles disposed on the opposite side, said apparatus having initiating means and comprising:
   a. a plurality of arrays of electrical terminals, each of said arrays being effective for receiving said pins of one of said plugs upon the plug-in attachment thereof by the wireman,
   b. a plurality of arrays of actuatable indicators associated with said terminal arrays and with said cylindrical receptacles of said plugs such that each terminal and cylindrical receptacle is associatively represented by one of said indicators,
   c. first semi-conductor means electrically connected to at least a predetermined pair of indicators and effective for actuating said pair upon activation of said initiating means to thereby indicate a first pair of cylindrical receptacles to be connected by the wireman in performing a predetermined wiring sequence, said first semi-conductor means being electrically connectible successively to other pairs of indicators to thereby switchably actuate said indicators to indicate succeeding pairs of associated cylindrical receptacles to be connected in said predetermined sequence, and
   d. second semi-conductor means electrically coupled to said first semi-conductor means and connectible via said succeeding pairs of cylindrical receptacles to said other pairs of indicators to thereby switchably control said first semi-conductor means to actuate succeeding pairs of indicators when all pairs of cylindrical receptacles corresponding to previously actuated pairs of indicators have been properly interconnected.

2. Apparatus as defined in claim 1 wherein said first semi-conductor means includes one indicator switching member associated with each step in said predetermined wiring sequence, each of said indicator switching members being connectible to any and all of said indicators in a different one of said indicator arrays.

3. Apparatus as defined in claim 2 wherein said second semi-conductor means includes one indicator switching control member associated with each step in said predetermined wiring sequence, each of said control members being connectible to a predetermined one of said cylindrical receptacles in the one of said terminal arrays associated with a common step in said wiring sequence and coupled with both an indicator switching member associated with said common step and with a switching member associated with the next succeeding step in said wiring sequence.

4. Apparatus as defined in claim 3 wherein each of said indicator switching members of said first semi-conductor means is a first transistor having two conducting states and being operative in a first of said states to actuate said pair of indicators connected thereto and in a second of said states to deactuate said pair of indicators.

5. Apparatus as defined in claim 4 wherein each of said indicator switching control members of said second semi-conductor means is a second transistor being operative upon the electrical interconnection of said associated pairs of cylindrical receptacles for biasing the first transistor commonly associated with a discrete step in said predetermined wiring sequence in said second state and for biasing another first transistor associated with a next step in said sequence in a said first state.

6. Apparatus for assisting a wireman in the fabrication of a wire harness, said harness including a plurality of terminal plugs each representing a separate leg thereof, each of said plugs having a plurality of projecting pins arranged on one side thereof and a corresponding number of communicating cylindrical receptacles disposed on the opposite side, said apparatus having initiating means and comprising:
   a. a plurality of arrays of electrical terminals, each of said arrays being effective for receiving said pins of one of said plugs upon the plug-in attachment thereof by the wireman,
   b. a plurality of arrays of actuatable indicators associated with said terminal arrays and with said cylindrical receptacles of said plugs such that each terminal and cylindrical receptacle is associatively represented by one of said indicators,
   c. first semi-conductor means electrically connected to a predetermined trio of indicators and effective for actuating said trio upon activation of said initiating means to thereby indicate a first pair of cylindrical receptacles to be connected and a selected wire that is to be used therefor in performing a predetermined wiring sequence, said first semi-conductor means being electrically connectible successively to other trios of indicators to thereby switchably actuate said indicators to indicate succeeding pairs of cylindrical receptacles to be connected and the selected wires to be used therefor, and
   d. second semi-conductor means electrically coupled to said first semi-conductor means and connectible via said succeeding elected wires and pairs of cylindrical receptacles to said other trios of indicators to thereby switchably control said first semi-conductor means to actuate succeeding trios of indicators when all pairs of cylindrical receptacles corresponding to previously actuated trios of indicators have been properly interconnected.

7. Apparatus as defined in claim 6 wherein said first semi-conductor means includes a first transistor associated with each step in said predetermined wiring sequence, said first transistor having two conducting states and being operative in a first of said states to actuate said trio of indicators connected thereto and in a second of said states to deactuate said trio of indicators.

8. Apparatus as defined in claim 7 wherein said second semi-conductor means includes a second transistor associated with each step in said predetermined wiring sequence, each of said second transistors being operative upon the electrical interconnection of said associated pairs of cylindrical receptacles for biasing the first transistor commonly associated with a discrete step in said predetermined wiring sequence in said second state and for biasing another first transistor associated with a next step in said sequence in a said first state.

9. Apparatus for assisting a wireman in the fabrication of a wire harness, said harness including a plurality of terminal plugs each representing a separate leg thereof, each of said plugs having a plurality of projecting pins arranged on one side thereof and a corresponding number of communicating cylindrical receptacles disposed on the opposite side, said apparatus having initiating means and comprising:
   a. a plurality of arrays of electrical terminals, each of said arrays being effective for receiving said pins of one of said plugs upon the plug-in attachment thereof by the wireman, said terminals being associated in predetermined groups corresponding to steps in a predetermined wiring sequence required in the fabrication of said wire harness,
   b. a plurality of arrays of actuatable indicators associated with said terminal arrays and with said cylindrical receptacles of said plugs such that each terminal and cylindrical receptacle is associatively represented by one of said indicators, said indicators being associated in groups corresponding to said predetermined groups of terminals,
   c. a plurality of indicator switching members each associated with a different terminal group in said predetermined sequence, a predetermined one of said switching members being electrically connected to a predetermined group of indicators and effective for actuating said group of indicators upon activation of said initiating means to thereby indicate a first pair of cylindrical receptacles to be connected in said predetermined wiring sequence, the remaining ones of said switching members being electrically connectible successively to other groups of indicators to thereby switchably actuate said indicators to indicate succeeding pairs of associated cylindrical receptacles to be connected in said sequence,
   d. a plurality of switching control members for controlling connected ones of said switching members in response to a completed intra-connection of an associated terminal group, e. first means connecting each of said switching members to an indicator group corresponding to its associated terminal group,
f. second means connecting each of said switching control members to a commonly associated switching member and to a switching member associated with the next succeeding terminal group in the sequence, and
g. third means interconnecting successive terminal groups such that each of said control members in response to the intra-connection of its associated terminal group and all preceding terminal groups controls said commonly associated switching member to deactuate said indicator group connected thereto and controls said switching member associated with the next succeeding terminal group to actuate said indicator group connected thereto, whereby at any point in said predetermined wiring sequence, upon the chance disturbance of a previously made intra-connection between preceding terminal groups, the control member associated with the terminal group next to be intra-connected will control its commonly associated switching member to deactuate said switching member associated with said next succeeding terminal group and actuate the switching member commonly associated with the indicator group and terminal group representing that point in the wiring sequence where said chance disturbance has occurred, to thereby automatically alert the wireman as to the fact and location of said disturbance.

10. Apparatus as defined in claim 9 wherein said first, said second, and said third means are electrically conductive wires fixedly joining respective elements.

11. A wiring assist device for use by a wireman in fabricating a predetermined wire harness, said harness including a plurality of electrical plugs each representing a separate leg thereof, each of said plugs having a plurality of pins arranged on one side thereof and a corresponding number of communicating cylindrical receptacles disposed on the opposite side, said apparatus having initiating means and comprising:
a. a plurality of arrays of electrical terminals, each of said arrays being effective for receiving said pins of one of said plugs,
b. a plurality of arrays of actuatable indicators associated with said terminal arrays and with said cylindrical receptacles such that each terminal and corresponding cylindrical receptacle is represented by one of said indicators,
c. first semi-conductor means electrically connected to a predetermined trio of indicators and effective for actuating said trio upon activation of said initiating means to thereby indicate a first pair of cylindrical receptacles to be connected and a selected wire that is to be used therefor in a predetermined wiring sequence, said first semi-conductor means being electrically connectible successively to other trios of indicators to thereby switchably actuate said indicators to indicate succeeding pairs of cylindrical receptacles to be connected and the selected wires to be used therefor, said first semi-conductor means including a plurality of indicator switching members,
d. second semi-conductor means electrically coupled to said first semi-conductor means and connectible via said succeeding selected wires and pairs of cylindrical receptacles to said other trios of indicators to thereby switchably control said first semi-conductor means to actuate succeeding trios of indicators when all pairs of cylindrical receptacles corresponding to previously actuated trios of indicators have been properly interconnected, said second semi-conductor means including a plurality of switching control members,
e. first means connecting each of said switching members to a trio of indicators corresponding to an associated pair of cylindrical receptacles,
f. second means connecting each of said switching control members to a commonly associated switching member and to a switching member associated with the next succeeding trio of indicators and pair of cylindrical receptacles involved in the predetermined sequence, and
g. third means interconnecting successive pairs of cylindrical receptacles such that each of said control members in response to the intra-connection of its associated pair of receptacles and all preceding pairs of receptacles controls said commonly associated switching member to deactuate the trio of indicators connected thereto and controls the switching member associated with the next succeeding pair of receptacles to actuate the trio of indicators connected thereto, whereby at any point in the predetermined sequence, upon the chance disturbance of a previously made intra-connection between preceding pairs of receptacles, the control member associated with the pair of receptacles next to be intra-connected will control its commonly associated switching member to deactuate said switching member associated with said next succeeding pair of terminals and actuate the switching member commonly associated with the trio of terminals and pair of receptacles representing that point in the wiring sequence where said chance disturbance has occurred, to thereby automatically alert the wireman as to the fact and location of said disturbance.

* * * * *